(12) United States Patent
Sato

(10) Patent No.: US 6,502,028 B2
(45) Date of Patent: Dec. 31, 2002

(54) VEHICULAR DECELERATION CONTROL APPARATUS, AND BRAKING SYSTEM CONTROL METHOD

(75) Inventor: Kunihito Sato, Mishima (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 2 days.

(21) Appl. No.: 09/834,881

(22) Filed: Apr. 16, 2001

(65) Prior Publication Data

US 2001/0037171 A1 Nov. 1, 2001

(30) Foreign Application Priority Data

Apr. 28, 2000 (JP) ........................................ 2000-131185

(51) Int. Cl.$^7$ ................................................. B60T 7/12
(52) U.S. Cl. ........................... 701/70; 701/93; 180/170; 180/178; 303/122
(58) Field of Search ........................... 701/70, 76, 79, 701/93; 180/170, 175, 178; 303/122, 122.05, 125, 138

(56) References Cited

U.S. PATENT DOCUMENTS

| 4,750,598 A | * | 6/1988 | Danno et al. ............... 123/361 |
| 4,841,446 A | * | 6/1989 | Leiber et al. .......... 303/122.01 |
| 5,647,647 A | * | 7/1997 | Kato et al. ............. 303/122.09 |
| 5,731,977 A | * | 3/1998 | Taniguchi et al. .......... 180/169 |
| 6,070,682 A | * | 6/2000 | Isogai et al. ................. 180/167 |

FOREIGN PATENT DOCUMENTS

| JP | 63-232037 | * | 9/1988 | ........... B60K/31/06 |
| JP | A 9-95222 | | 4/1997 | |
| JP | A 9-272419 | | 10/1997 | |

* cited by examiner

Primary Examiner—Michael J. Zanelli
Assistant Examiner—Eric M Gibson
(74) Attorney, Agent, or Firm—Oliff & Berridge, PLC

(57) ABSTRACT

The vehicular deceleration control apparatus applies deceleration to a vehicle in accordance with the amount of operation of an accelerator. The deceleration control apparatus determines whether there is an abnormality based on a deviation between a set target deceleration and a detected actual deceleration. If an abnormality of a system is detected, the apparatus discontinues the control, and transmits a system abnormality signal to indicate the abnormality to other systems and to an operator.

16 Claims, 6 Drawing Sheets

VEHICULAR DECELERATION CONTROL APPARATUS, AND BRAKING SYSTEM CONTROL METHOD

INCORPORATION BY REFERENCE

The disclosure of Japanese Patent Application No. 2000-131185 filed on Apr. 28, 2000 including the specification, drawings and abstract is incorporated herein by reference in its entirety.

BACKGROUND OF THE INVENTION

1. Field of Invention

The invention relates to a vehicular deceleration control apparatus and method for adding deceleration to a vehicle and, more particularly, to a vehicular deceleration control apparatus that detects the state of operation of an accelerator and adds deceleration to a vehicle in accordance with the state of operation, and to a method of controlling a braking system.

2. Description of Related Art

As an art related to the invention, a deceleration control apparatus that adds deceleration to a vehicle by generating a braking force when an operating person discontinues depression of an accelerator pedal is disclosed in Japanese Patent Application Laid-Open No. 9-95222. The deceleration control apparatus described in this laid-open patent application adds a braking force to a main brake system when the accelerator pedal is within a deceleration range.

If this deceleration control apparatus is installed in a vehicle, it becomes unnecessary to operate the brake pedal frequently when the vehicle is to be gently accelerated or decelerated. Furthermore, deceleration responsiveness is enhanced. Thus, easy driving can be realized.

However, the aforementioned laid-open patent application does not disclose detection of or response to a failure in the system.

SUMMARY OF THE INVENTION

Accordingly, the invention provides a vehicle deceleration control apparatus capable of detecting a system abnormality during an early period.

In order to achieve the foregoing, a vehicular deceleration control apparatus in accordance with a first aspect of the invention includes an accelerator operation state detector and a deceleration adder. The apparatus controls the additional deceleration based on a target deceleration set in accordance with detection results by the accelerator operation state detector. The deceleration control apparatus of the invention determines whether the system is abnormal based on a deviation between the target deceleration and a detected actual deceleration.

A vehicular deceleration control apparatus in accordance with a second aspect of the invention includes an accelerator operation state detector and a deceleration adder. The apparatus controls the additional deceleration by the deceleration adder in accordance with detection results by the accelerator operation state detector. The deceleration control apparatus of the invention determines whether the system is abnormal based on a deviation between a target braking torque to be applied by the deceleration adder and a detected actual braking torque.

A vehicular deceleration control apparatus in accordance with a third aspect of the invention has an accelerator operation state detector and a deceleration adder. The apparatus controls the additional deceleration by the deceleration adder in accordance with detection results by the accelerator operation state detector. The deceleration control apparatus of the invention determines whether the system is abnormal based on a correspondence between the state of operation of the accelerator and the actual deceleration.

If the deceleration adder has an abnormality, the actually applied deceleration will not equal a target deceleration. According to the invention, it is possible to determine whether the system is abnormal by detecting a braking torque or a deceleration that is actually generated, and by examining a deviation between the detected braking torque or deceleration and a braking torque or deceleration that is to be generated or examining a correspondence between the detected braking torque or deceleration and the state of operation of the accelerator. Thus, the invention makes it possible to detect an abnormality in the deceleration control system during an early period, and to prompt an operator to take an appropriate measure.

If it is determined that the system is abnormal, the deceleration added by the deceleration adder may be decreased with a predetermined time gradient. Therefore, it becomes possible to discontinue the deceleration adding control without sharply changing the deceleration, if it is determined that there is an abnormality.

The deceleration adder may add a deceleration by operating a braking device that applies braking torque to a wheel based on a braking operating performed by the operator. In this case, the deceleration adder constitutes a braking system as well. Therefore, an abnormality in the braking system can be detected during an early period.

The invention is not limited to the aforementioned vehicular deceleration control apparatus. Further aspects of the invention include, for example, a vehicle equipped with a vehicular deceleration control apparatus, and a method of controlling a braking system that applies deceleration to a vehicle.

BRIEF DESCRIPTION OF THE DRAWINGS

The foregoing and further objects, features and advantages of the invention will become apparent from the following description of an exemplary embodiment with reference to the accompanying drawings, wherein like numerals are used to represent like elements and wherein.

DETAILED DESCRIPTION OF PREFERRED EMBODIMENTS

An exemplary embodiment of the invention will be described hereinafter with reference to the accompanying drawings.

Figure 1:
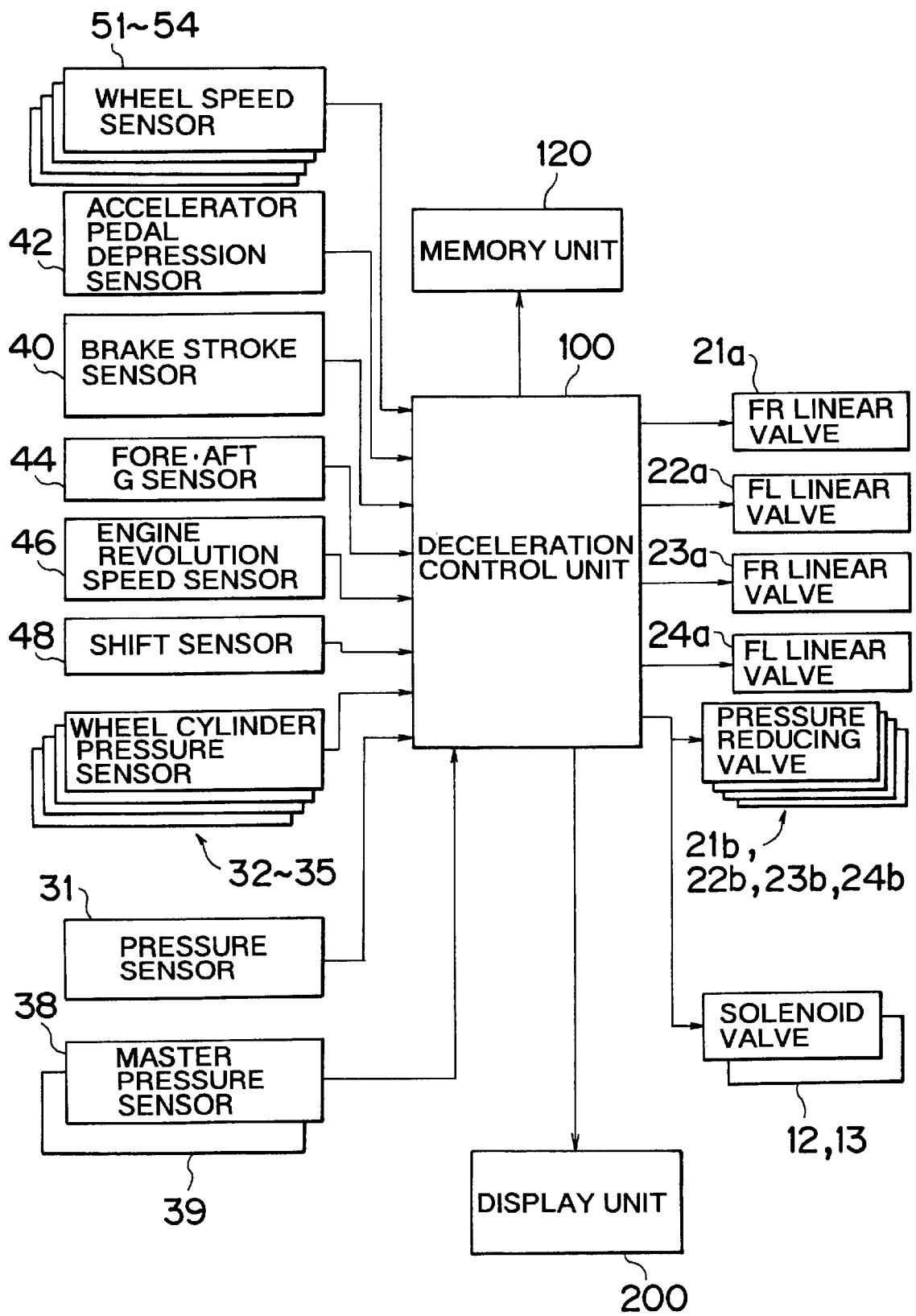
FIG. 1 is a diagram illustrating a construction of a deceleration control apparatus according to the invention.
Figure 2:
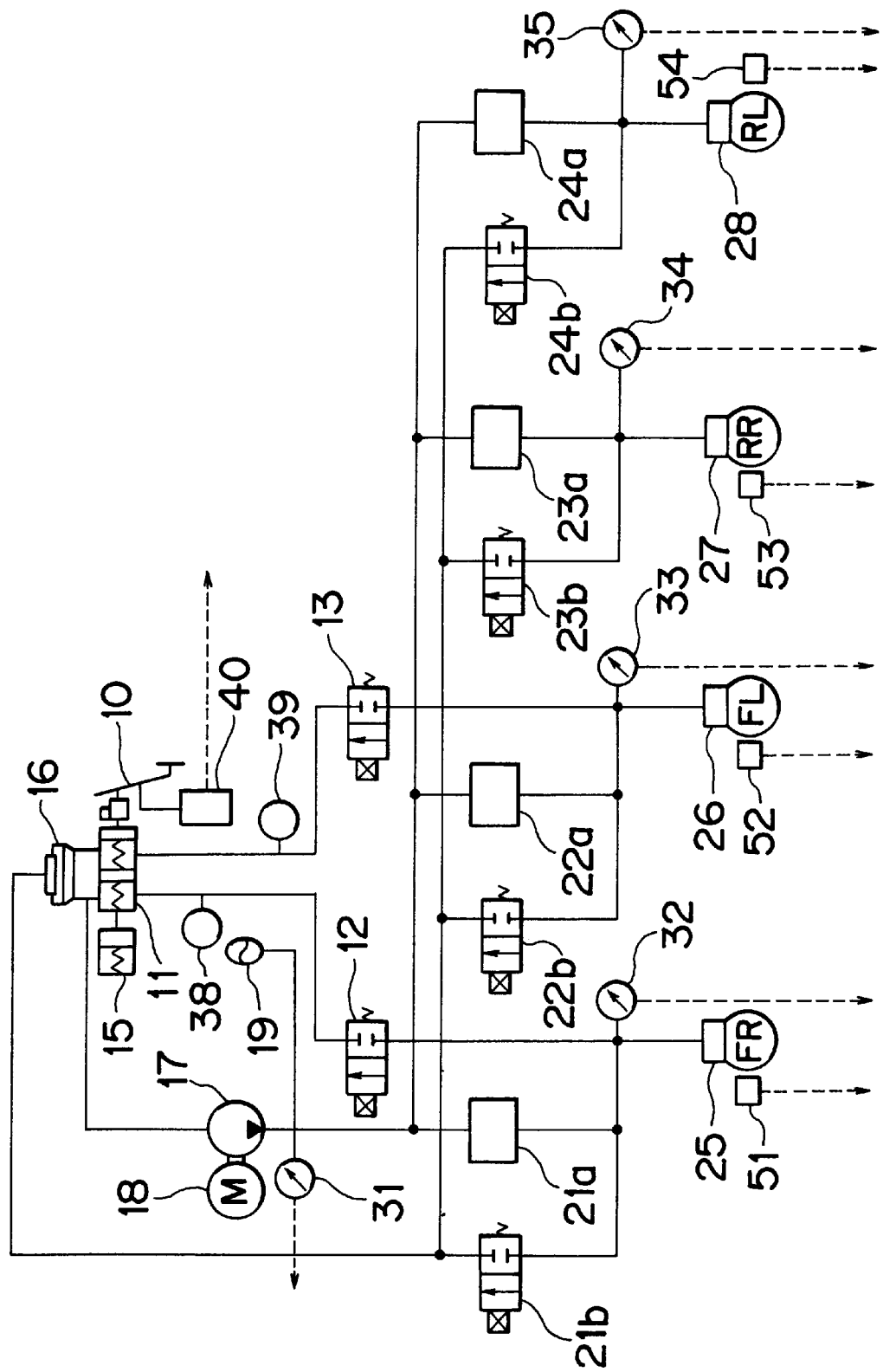
FIG. 2 is a diagram illustrating a construction of a braking system of a vehicle equipped with the deceleration control apparatus according to the invention.

FIG. 1 is a diagram illustrating a construction of a deceleration control system that includes a deceleration control apparatus according to an exemplary embodiment of the invention. FIG. 2 is a diagram illustrating a construction of a braking system of a vehicle equipped with the deceleration control apparatus.

The construction of the braking system of the vehicle will first be described with reference to FIG. 2. In this vehicle, front wheels FR, FL and rear wheels RR, RL are provided with wheel cylinders 25–28, respectively, for braking the wheels. When a predetermined fluid pressure is supplied to the wheel cylinders 25–28, brakes are driven, thereby braking the vehicle. The wheels FR, FL, RR, RL are provided with wheel speed sensors 51–54 for detecting the wheel speeds Vw of the wheels, respectively.

A brake pedal 10 for operating the above-described braking system is connected to a piston shaft of a master cylinder 11. A brake stroke sensor 40 for detecting the state of operation of the brake pedal 10 is connected to the brake pedal 10. A stroke simulator 15 is connected to a side of the master cylinder 11 opposite from the brake pedal 10. In response to operation of the brake pedal 10, the stroke simulator 15 generates an appropriate repulsive force.

Two hydraulic fluid lines extending from the master cylinder 11 are connected to the wheel cylinders 25, 26 of the front-right wheel FR and the front-left wheel FL via solenoid valves 12, 13, respectively. The path extending from the master cylinder 11 to the solenoid valve 12 is provided with a master pressure sensor 38. The path extending from the master cylinder 11 to the solenoid valve 13 is provided with a master pressure sensor 39.

A hydraulic fluid line extending from a reservoir tank 16 is connected to a pump 17 that is driven by a motor 18. A hydraulic fluid line extending from the pump 17 is connected to the wheel cylinders 25, 26, 27, 28 via linear valves 21a, 22a, 23a, 24a, respectively. A pressure sensor 31 and an accumulator 19 are disposed between the pump 17 and a branching portion to the linear valves 21a–24a. Pressure reducing valves 21b, 22b, 23b, 24b are connected to hydraulic fluid lines extending from the wheel cylinders 25–28 back to the reservoir tank 16, respectively. The wheel cylinders 25–28 are provided with wheel cylinder pressure sensors 32, 33, 34, 35, respectively.

A deceleration control unit 100 that forms a control unit of the deceleration control apparatus according to the invention is supplied with output signals of the brake stroke sensor 40 for detecting the amount of depression of the brake pedal 10, an accelerator pedal depression sensor 42 for detecting the amount of depression θa of an accelerator pedal 4, the wheel speed sensors 51–54, a fore-aft G sensor 44 for detecting the acceleration Gy of the vehicle body in the fore-aft directions, an engine revolution speed sensor 46, a shift sensor 48, the wheel cylinder pressure sensors 32–35, the pressure sensor 31, and the master pressure sensors 38, 39.

The deceleration control unit 100 has a memory unit 120 that stores tables, constants, etc. for use for the deceleration control. The deceleration control unit 100 controls the linear valves 21a–24a and the pressure reducing valves 21b–24b connected to the wheel cylinders 25–28, and the solenoid valves 12, 13. Furthermore, the deceleration control unit 100 causes a display system 200 to display the state of operation of the deceleration control system and thus performs notification to an operator by sending necessary information to the display system 200.

Basic operation of the braking system performed at the time of braking will be described. Hydraulic fluid from the reservoir tank 16 is kept at a predetermined increased pressure in the pipe downstream of the pump 17. The accumulator 19 serves to maintain this pressure. If the fluid pressure of hydraulic fluid detected by the pressure sensor 31 is lower than the aforementioned predetermined pressure, the pump 17 is driven by the motor 18 to increase the pressure of hydraulic fluid in the downstream-side pipe to the predetermined pressure. When the brake pedal 10 is depressed, the piston shaft of the master cylinder 11 is pushed to generate a fluid pressure (master pressure) in accordance with the amount of operation of the brake pedal 10. During a normal state, the solenoid valves 12, 13 are in a blocking state, so that the master pressure is not directly conveyed to the wheel cylinder 25 of the front-right wheel FR nor to the wheel cylinder 26 of the front-left wheel FL. The amount of operation of the brake pedal 10 is detected by the master pressure sensors 38, 39. In accordance with the amount of operation of the brake pedal 10, the deceleration control unit 100 calculates a target fluid pressure (target wheel cylinder pressure) that should be applied to each of the wheel cylinders 25–28. By controlling the operation of the linear valves 21a–24a and the pressure reducing valves 21b–24b, the deceleration control unit 100 adjusts the wheel cylinder pressure conveyed to each wheel cylinder 25–28 (measured by a corresponding one of the wheel cylinder pressure sensors 32–35) so that the wheel cylinder pressure becomes equal to the target wheel cylinder pressure determined as described above. Thus, by controlling the wheel cylinder pressures conveyed to the wheel cylinders 25–28 independently, the deceleration control unit 100 is able to control the braking force applied to each wheel independently.

At the time of an abnormality in the braking system, the deceleration control unit 100 sets the solenoid valves 12, 13 to a conducting state, so that the master pressure from the master cylinder 11 is conveyed to the wheel cylinder 25 of the front-right wheel FR and the wheel cylinder 26 of the front-left wheel FL via the solenoid valves 12, 13, respectively, thereby braking the front wheels FR, FL.

Figure 3:
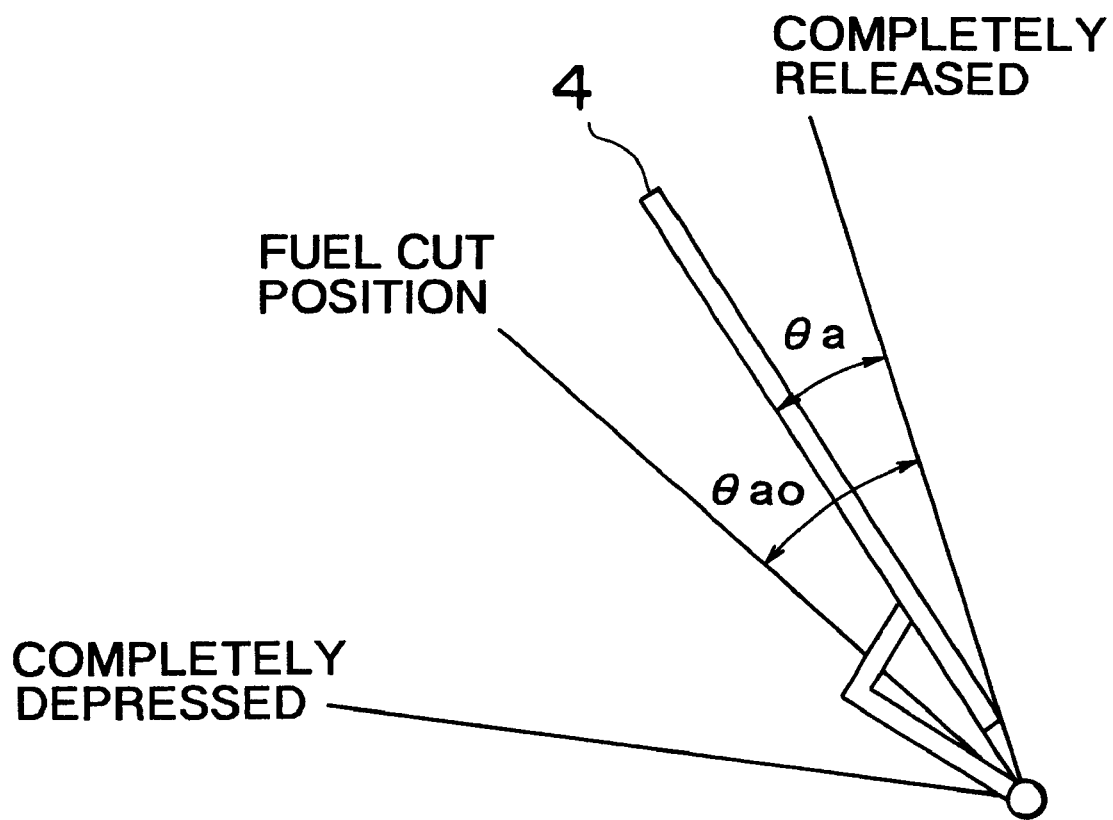
FIG. 3 is a diagram illustrating the amount of depression of an accelerator pedal.
Figure 4:
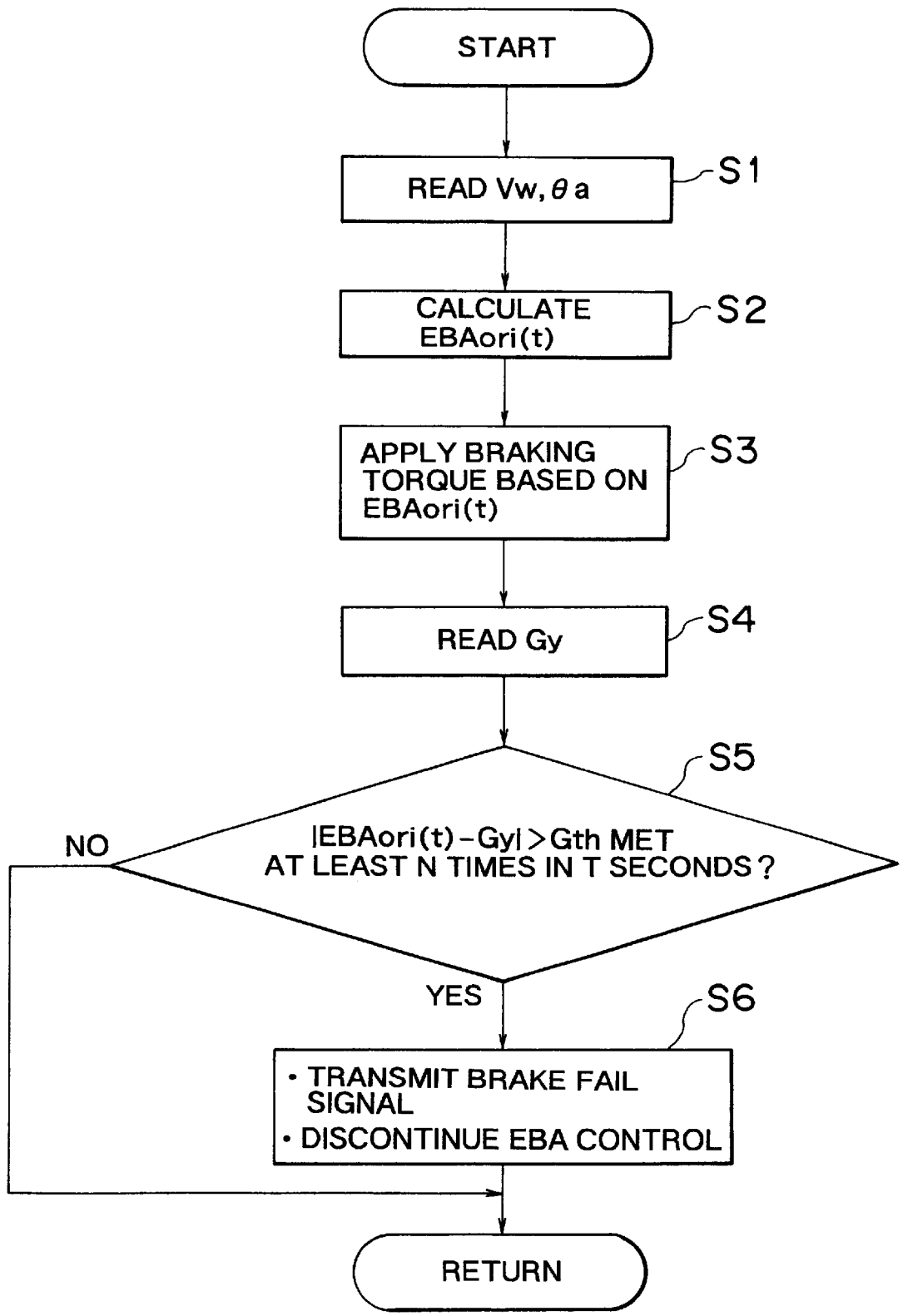
FIG. 4 is a flowchart illustrating a deceleration control performed by the apparatus shown in FIG. 1.

Furthermore, in this exemplary embodiment, when the accelerator pedal 4 is returned from a depressed state, a braking force is added to generate a deceleration, thereby performing a deceleration control for assisting the engine brake effect, which tends to be particularly insufficient in automatic transmission-equipped vehicles. Hereinafter, this deceleration control is termed engine brake assist (EBA) control. FIG. 3 is a diagram illustrating the state of the accelerator pedal 4. FIG. 4 is a flowchart of the EBA control.

In FIG. 3, illustrates the state of the accelerator pedal 4, the accelerator pedal depression amount θa indicates the amount of depression of the accelerator pedal 4 from a completely released position, that is, the accelerator pedal depression amount θa becomes "0" when the accelerator pedal 4 is at the completely released position. When the depression amount is θa0, the accelerator pedal 4 is at a fuel cut position.

The EBA control illustrated in FIG. 4 is performed by the deceleration control unit 100. The control is repeatedly executed at a predetermined timing after the engine of the vehicle is started. However, when the brake pedal 10 is operated, braking torque is applied in accordance with the state of operation of the brake pedal 10, so that the process illustrated by the flowchart of FIG. 4 is not performed but is skipped.

In step S1, the deceleration control unit 100 reads the accelerator pedal depression amount θa received as an output signal of the accelerator pedal depression sensor 42 provided for the accelerator pedal 4, and wheel speeds Vwfr, Vwfl, Vwrr, Vwrl of the wheels FR, FL, RR, RL received as output signals of the wheel speed sensors 51–54. The maximum value of the wheel speeds Vwfr, Vwfl, Vwrr, Vwrl is set as an estimated vehicle speed Vr.

In step S2, the control unit 100 calculates a reference deceleration EBAori(t) that is to be added, based on the estimated vehicle speed Vr and the accelerator pedal depression amount θa. More specifically, if the accelerator pedal 4 is positioned on a completely released side of the fuel cut position, that is, if 0≦θa<θa0, EBAori(t) is set based on the following expression:

$$EBAori(t)=f(Vr)\times(\theta a0-\theta a)$$

Subsequently in step S3, the control unit 100 determines a braking torque that is to be applied to each wheel, based on EBAori(t), and then calculates a wheel cylinder that will provide the determined braking toque. After that, the control unit 100 adjusts the fluid pressure acting on the wheel cylinder 25–28 of each wheel to the calculated wheel cylinder pressure by controlling the linear valves 21a–24a and the pressure reducing valves 21b–24b. When the accelerator pedal 4 is returned, an engine control unit (not shown) reduces the engine revolution speed by reducing the amounts of fuel and air supplied, thereby producing an engine brake effect wherein a braking force is generated by engine resistance. The braking torque added by the deceleration control apparatus assists the braking force generated by the engine brake effect. As a result, braking force is applied to the vehicle, thereby decelerating the vehicle. In intermediate and high speed regions, at a time point when the accelerator pedal 4 is returned from the fuel cut position to the completely released position side, the engine control unit stops the supply of fuel to the engine, thereby providing a further increased deceleration.

In step S4, the deceleration control unit 100 reads the actual deceleration Gy of the vehicle body from the output of the fore-aft G sensor 44. Subsequently in step S5, the control unit 100 determines whether a deviation between the actual deceleration Gy and the deceleration EBAori(t) to be added is greater than a threshold Gth. In order to prevent a false determination, affirmative determination is made at step S5 provided that the determination condition is satisfied at least N times within T seconds.

If the aforementioned deviation is less than the threshold Gth, the deceleration control unit 100 determines that there is no abnormality in the deceleration control system, and skips the subsequent processing and ends the routine. Conversely, if the deviation is greater that the threshold Gth, it is considered that a deceleration greater than requested has been provided or that a deceleration requested has not been provided. Therefore, the control unit 100 determines that an abnormality has occurred in the deceleration control system, and then proceeds to step S6. In step S6, the control unit 100 transmits to the display system 200 and other control systems a brake fail signal indicating that an abnormality has occurred in the braking system, and then discontinues the EBA control. In this manner, the deceleration control unit 100 notifies an operator of the abnormality in the braking system, and indicates the abnormality of the braking system to other systems. In various exemplary embodiments, the discontinuation of the EBA control is performed by gradually decreasing the deceleration, so that a sharp change in the deceleration is avoided, and so that the operator will not feel an uncomfortable sensation. After the end of the control flow, the processing of this flowchart is skipped.

Although in the foregoing exemplary embodiment, the braking system is directly controlled to provide deceleration, it is also possible to adopt a construction in which deceleration is provided by operating the drive system. However, in an exemplary embodiment in which the braking system is directly controlled, an abnormality in the braking system can be detected at the time of execution of the EBA control. Therefore, the exemplary embodiment has an advantage of being able to detect an abnormality in the braking system during an earlier period and to prompt an operator to take an appropriate measure.

Figure 5:
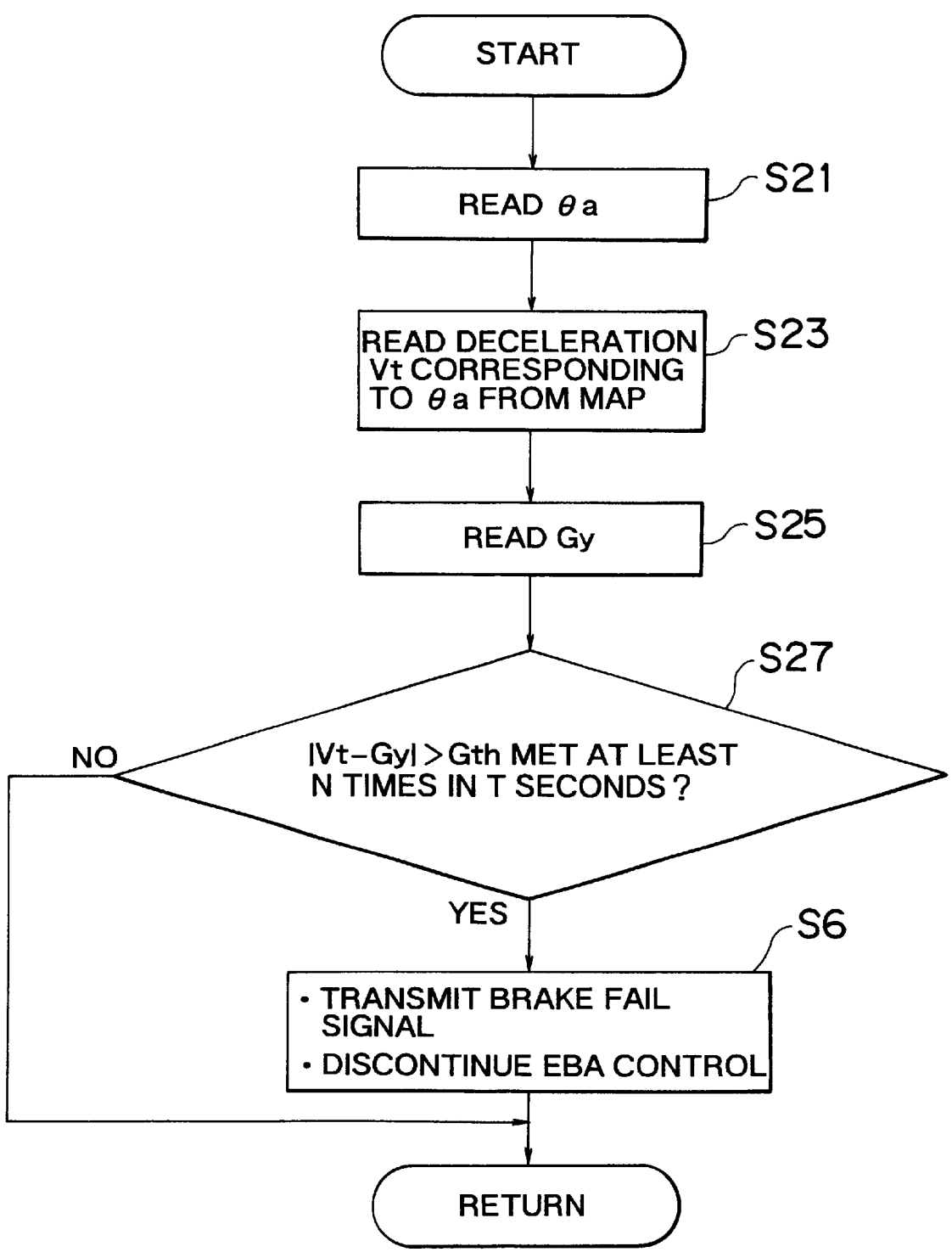
FIG. 5 is a flowchart illustrating another deceleration control performed by the apparatus shown in FIG. 1.

Furthermore, the detection of actual deceleration is not restricted by the method and the apparatus that use the aforementioned fore-aft G sensor. For example, actual deceleration may be determined by detecting the vehicle speed and differentiating the vehicle speed by time. Furthermore, it is possible to adopt a construction in which decelerations corresponding to accelerator pedal depression amounts are pre-stored in the form of a map in the memory unit 120, and an abnormality in the deceleration control system is determined based on a deviation between an actual deceleration and a corresponding deceleration stored in the map. FIG. 5 is a flowchart of an EBA control in which it is determined whether the deceleration control system has an abnormality based on a correspondence between the accelerator pedal depression amount and the actual deceleration. In step 21, an accelerator pedal depression amount θa is read. The memory unit 120 stores deceleration Vt corresponding to the accelerator pedal depression amount θa. In step 23, a deceleration corresponding to the read accelerator pedal depression amount θa is read out from the memory unit 120. In step 25, an actual deceleration Gy of the vehicle body is read from the output of the fore-aft G sensor 44. In step S27, it is determined whether a deviation between the actual deceleration Gy and the deceleration Vt corresponding to the accelerator pedal depression amount is greater than a threshold Gth. In order to prevent false determination, affirmative determination is made at step S27 provided that the determination condition is satisfied at least N times within T seconds.

If the aforementioned deviation is less than the threshold Gth, the deceleration control unit 100 determines that there is no abnormality in the deceleration control system, and skips the subsequent processing and ends the routine. Conversely, if the deviation is greater that the threshold Gth, it is considered that a deceleration greater than requested has been provided or that a deceleration requested has not been provided. Therefore, the control unit 100 determines that an abnormality has occurred in the deceleration control system, and then proceeds to step S6. In step S6, the control unit 100 transmits to the display system 200 and other control systems a brake fail signal indicating that an abnormality has occurred in the braking system, and then discontinues the EBA control. In this manner, the deceleration control unit 100 notifies an operator of the abnormality in the braking system, and indicates the abnormality of the braking system to other systems. In various exemplary embodiments, the discontinuation of the EBA control is performed by gradually decreasing the deceleration, so that a sharp change in the deceleration is avoided, and so that the operator will not feel an uncomfortable sensation. After the end of the control flow, the processing of this flowchart is skipped.

Furthermore, it is also possible to adopt a construction in which a braking torque that is actually acting is detected or estimated, and a deviation between the braking torque and a target braking torque, and the deviation is used as a basis for determining whether the deceleration control system has an abnormality.

Figure 6:
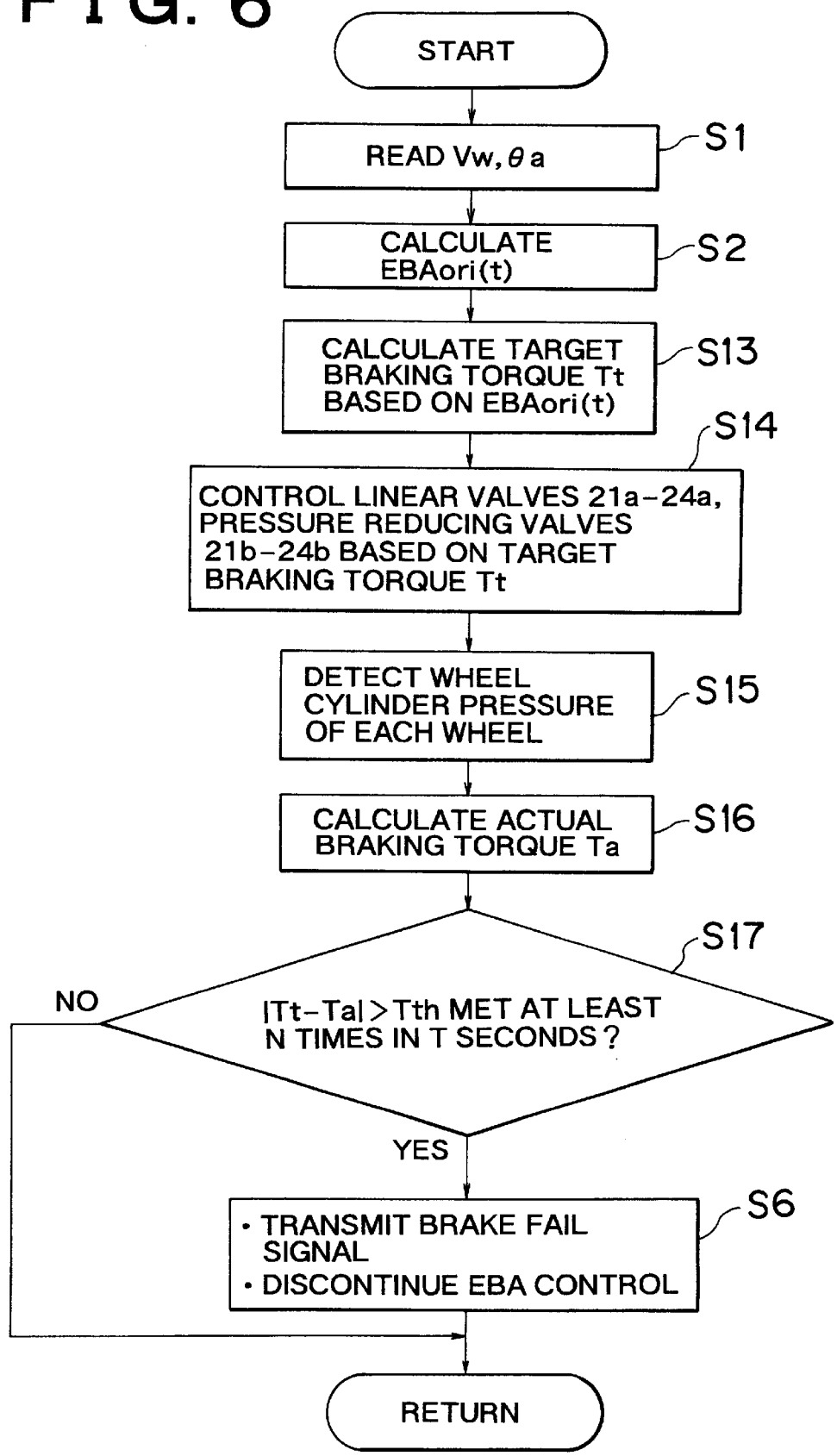
FIG. 6 is a flowchart illustrating still another deceleration control performed by the apparatus shown in FIG. 1.

FIG. 6 is a flowchart of an EBA control in which it is determined whether the deceleration control system has an abnormality based on the deviation between the actual braking torque and the target braking torque. Steps S1, S2 are the same as those in the EBA control illustrated in FIG. 4. In step S13, subsequent to step S2, the control unit 100 calculates a target braking torque Tt that is needed to achieve the reference deceleration EBAori(t) determined in step S2.

Subsequently in step S14, the control unit 100 adjusts the wheel cylinder pressures acting on the wheel cylinders 25–28 of the wheels by controlling the linear valves 21a–24a and the pressure reducing valves 21b–24b so that the braking torque Tt will be obtained. When the accelerator pedal 4 is returned, an engine control unit (not shown) reduces the engine revolution speed by reducing the amounts of fuel and air supplied, thereby producing an engine brake effect wherein a braking force is generated by engine resistance. The braking torque added by the deceleration control apparatus assists the braking force generated by the engine brake effect. As a result, braking force is applied to the vehicle, thereby decelerating the vehicle. In intermediate and high speed regions, at a time point when the accelerator pedal 4 is returned from the fuel cut position to the completely released position side, the engine control unit stops the supply of fuel to the engine, thereby providing a further increased deceleration.

Subsequently in step S15, the control unit 100 detects the wheel cylinder pressure acting on each wheel cylinder 25–28 of the wheels by using the corresponding one of the wheel cylinder pressure sensors 32–35. Subsequently in step S16, the control unit 100 calculates an actual braking torque Ta that actually acts, based on the wheel cylinder pressures.

In step S17, the control unit 100 determines whether the deviation between the actual braking torque Ta and the target braking torque Tt is greater than a threshold Tth. In order to prevent false determination, affirmative determination is made at step S17 provided that the determination condition is satisfied at least N times within T seconds.

If the deviation is less than the threshold Tth, the control unit 100 determines that the deceleration control system has no abnormality, and skips the subsequent processing and ends the routine. Conversely, if the deviation is greater than the threshold Tth, that is, if the actually obtained braking torque is greater or less than the target value by more than the threshold Tth, the control unit 100 determines that an abnormality has occurred in the deceleration control system, and then proceeds to step S6. In step S6, the control unit 100 transmits to the display system 200 and other control systems a brake fail signal indicating that an abnormality has occurred in the braking system, and then discontinues the EBA control. Subsequent processes are substantially the same as those in the EBA control illustrated in FIG. 4.

This manner of control, as in the EBA control illustrated in FIG. 4, makes it possible to notify an operator of an abnormality of the braking system and to indicate the abnormality of the braking system to other systems.

In the illustrated embodiment, the controller (the deceleration control unit 100) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A deceleration control apparatus having a braking system of a vehicle, the apparatus comprising:
   an accelerator operation state detector that detects a state of operation of an accelerator;
   a deceleration adder that adds a deceleration to the vehicle;
   a deceleration detector that detects an actual deceleration of a vehicle body; and
   a controller that sets a target deceleration in accordance with the state of operation of the accelerator and controls an addition of the deceleration performed by the deceleration adder, based on the target deceleration, and determines whether the braking system is abnormal based on a deviation between the target deceleration and the actual deceleration.

2. A deceleration control apparatus according to claim 1, wherein if the controller determines that the system is abnormal, the controller decreases the deceleration added by the deceleration adder, with a predetermined time gradient.

3. A deceleration control apparatus according to claim 1, wherein the deceleration adder has a braking device that generates a braking torque for a wheel based on a braking operation, and adds a deceleration by operating the braking device.

4. A deceleration control apparatus according to claim 1, wherein an operator of the vehicle is notified of an abnormality of the system, if the controller determines that the system is abnormal.

5. A deceleration control apparatus having a braking system of a vehicle, the apparatus comprising:
   an accelerator operation state detector that detects a state of operation of an accelerator;
   a deceleration adder that adds a deceleration to the vehicle by applying a braking torque to a wheel;
   a braking torque detector that detects an actual braking torque that is actually generated; and
   a controller that sets a target braking torque that is to be applied by the deceleration adder, in accordance with the state of operation of the accelerator, and controls an addition of the deceleration performed by the deceleration adder, based on the target braking torque, and determines whether the braking system is abnormal based on a deviation between the target braking torque and the actual braking torque.

6. A deceleration control apparatus according to claim 5, wherein if the controller determines that the system is abnormal, the controller decreases the deceleration added by the deceleration adder, with a predetermined time gradient.

7. A deceleration control apparatus according to claim 5, wherein the deceleration adder has a braking device that generates a braking torque for a wheel based on a braking operation, and adds a deceleration by operating the braking device.

8. A deceleration control apparatus according to claim 5, wherein an operator of the vehicle is notified of an abnormality of the system, if the controller determines that the system is abnormal.

9. A vehicular deceleration control apparatus, comprising:
an accelerator operation state detector that detects a state of operation of an accelerator;
a deceleration adder that adds a deceleration to a vehicle;
a deceleration detector that detects an actual deceleration of a vehicle body; and
a controller that controls an addition of the deceleration performed by the deceleration adder, in accordance with the state of operation of the accelerator, and determines whether a braking system is abnormal based on a correspondence between the state of operation of the accelerator and the actual deceleration.

10. A deceleration control apparatus according to claim 9, further comprising a memory that stores a correspondence between the state of operation of the accelerator and the deceleration that is to be added by the deceleration adder, wherein the controller determines whether the braking system is abnormal based on a deviation between a deceleration corresponding to the state of operation of the accelerator and the actual deceleration.

11. A deceleration control apparatus according to claim 9, wherein if the controller determines that the braking system is abnormal, the controller decreases the deceleration added by the deceleration adder, with a predetermined time gradient.

12. A deceleration control apparatus according to claim 9, wherein the deceleration adder has a braking device that generates a braking torque for a wheel based on a braking operation, and adds a deceleration by operating the braking device.

13. A deceleration control apparatus according to claim 9, wherein an operator of the vehicle is notified of an abnormality of the braking system, if the controller determines that the braking system is abnormal.

14. A method of controlling a braking system of a vehicle, the method comprising:
detecting a state of operation of an accelerator;
setting a target deceleration in accordance with the detected state of operation of the accelerator;
adding a deceleration to a vehicle body based on the target deceleration;
detecting an actual deceleration of the vehicle body; and
determining whether the braking system is abnormal based on a deviation between the target deceleration and the actual deceleration.

15. A method of controlling a braking system of a vehicle, the method comprising:
detecting a state of operation of an accelerator;
setting a target braking torque to be added to a vehicle body in accordance with the detected state of operation of the accelerator;
adding a deceleration to the vehicle body by applying a braking torque to at least one wheel based on the target braking torque;
detecting an actual braking torque that is actually generated; and
determining whether the braking system is abnormal based on a deviation between the target braking torque and the actual braking torque.

16. A method of controlling a braking system of a vehicle, the method comprising:
detecting a state of operation of an accelerator;
adding a deceleration to a vehicle body in accordance with the detected state of operation of the accelerator;
detecting an actual deceleration of the vehicle body; and
determining whether the system is abnormal based on a correspondence between the state of operation of the accelerator and the actual deceleration.

* * * * *